UNITED STATES PATENT OFFICE.

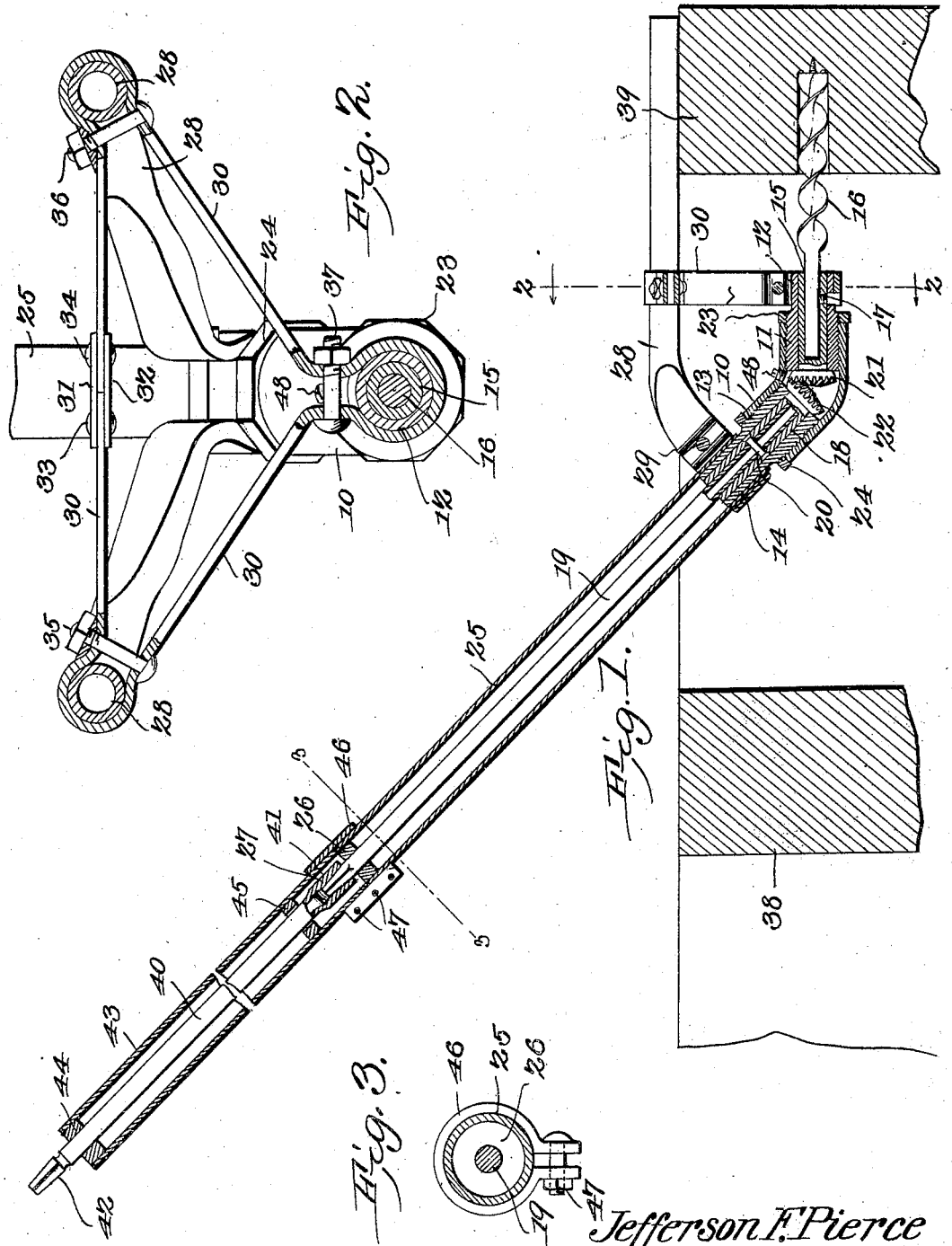

JEFFERSON F. PIERCE AND WILLARD G. PIERCE, OF TAMPA, FLORIDA.

BORING IMPLEMENT.

No. 836,212.  Specification of Letters Patent.  Patented Nov. 20, 1906.

Application filed October 14, 1905. Serial No. 282,813.

*To all whom it may concern:*

Be it known that we, JEFFERSON F. PIERCE and WILLARD G. PIERCE, citizens of the United States, residing at Tampa, in the county of Hillsboro and State of Florida, have invented a new and useful Boring Implement, of which the following is a specification.

This invention relates to improvements in implements adapted for boring or drilling in localities difficult of access, and has for its object to improve the construction and increase the efficiency of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that various changes in the form, proportion, and minor details of construction may be resorted to without departing from the principle or sacrificing any of the advantages of this invention within the scope of the appended claims.

In the drawings, Figure 1 is a longitudinal sectional elevation of the improved implement. Fig. 2 is a sectional view, enlarged, on the line 2 2 of Fig. 1. Fig. 3 is a transverse section, enlarged, on the line 3 3 of Fig. 1.

In the improved device is comprised a tubular casing 10, internally threaded at the ends and with one portion extending at an angle to the other portion preferably at about forty-five degrees.

Fitting into one of the threaded ends of the casing 10, which for the purpose of this description is referred to as the "forward portion," is a threaded tubular sleeve 11, having a bearing 12 at the outer end, and likewise fitting into the other threaded end of the casing, which for the purpose of this description is referred to as the "rear portion," is a similar threaded tubular sleeve 13, having a bearing 14 at the outer end.

Journaled in the sleeve 11 is a bit or drill socket 15, in which the boring implement, such as an augur 16, is secured by a set-screw 17 or other suitable means. Journaled in the sleeve 13 is a socket member 18 for receiving an operating-stock 19, preferably tubular, and secured to the socket, as by a rivet 20. The inner ends of the sleeve 15 and 18 are provided, respectively, with inter-engaging bevel-gears 21 22, operating within the casing 10. By this simple arrangement when the stock 19 is rotated the motion will be communicated to the bit or drill 16, as will be obvious.

Jam-nuts 23 24 will be applied to the threaded sleeves 11 and 13 and bearing upon the opposite ends of the casing 10 to prevent accidental displacement or the loosening of the sleeves when in use. The sleeves 11 and 13 being threaded in the casing 10 are easily adjustable longitudinally of the angularly-disposed ends of the same, and thus provide a simple means for adjusting the gears 21 22 and taking up wear as it occurs, and thus keeping the gears in working order and preventing rattling. When the adjustments have been accomplished, the jam-nuts 23 24 enable the adjustments to be maintained, as will be obvious.

Surrounding the stock portion 19 of the implement is a tubular shield 25, engaging the bearing 14 at one end and with an internal collar 26 at the other end for supporting the stock rotatively, the stock having a square end 27, protruding beyond the shield for receiving an ordinary "brace" or other implement for operating the stock.

The implement is preferably provided with supporting means consisting of a U-shaped member 28, bent at the center at an angle to the longitudinal plane of the sides or arms and bearing beneath the shield 25 opposite the rear bearing 14 and clamped thereto by a bolt 29. The spaced arms of the member 28 are also coupled by a strap 30, formed from a single piece and enclasping the forward bearing 12 of the sleeve 11 and the spaced sides of the member 28 and coupled at their ends by plates 31 32 and rivets 33 34. The strap-brace is also clamped in position by bolts 35, 36, and 37. The supporting member 28 is preferably formed from a section of gas-piping flattened centrally, where it is bent to engage the shield 25, as shown. The spaced sides or arms of the member 28 are parallel to each other and also spaced from and parallel to the longitudinal plane of the sleeve 11 and its bit-socket 15 and bit or other implement held thereby and is designed to bear upon the structure in which the boring or drilling is to be made, and thus support and guide the boring or drilling implement.

The device may be employed in many localities and for many purposes, but is more particularly adapted for boring in wood in localities inaccessible to an ordinary hand-brace—as, for instance, in boring transversely through the joists in buildings when installing electric wiring—and for the purpose of illustration is shown thus applied, a pair of joists being indicated at 38 39, with the member 28 resting upon the joist 39, through which the auger 16 is operating.

The stock 19 and its shield 25 may be of any required length and may be provided with an extension member 40, having a socket 41 at one end for engaging the square end 27 of the stock 19 and with the other end squared, as at 42, or otherwise formed to receive the brace or other operating implement. The extension-stock 40 is also provided with a tubular shield 43 and bearing-collars 44 45 and coupled to the shield 25 by a clamp-sleeve 46, the latter provided with clamp-bolts 47, as shown in Fig. 3. By this means the operating-stock may be extended to any required length when required.

A screw-plug 48 is tapped into the casing 10, as shown in Fig. 1, to provide means for inserting a lubricant for the gears 21 22 and other moving parts.

We claim—

1. In an implement of the class described, a tubular casing internally threaded at the ends and with the forward portion disposed at an angle to the rear portion, a tubular sleeve externally threaded and adjustably engaging the forward portion of said casing, a tubular sleeve externally threaded and adjustably engaging the rear portion of said casing, a socket member journaled in said forward sleeve and having a cavity for receiving a boring implement, a socket member journaled in the rear sleeve and having a cavity extending longitudinally therein, a stock engaging said longitudinal cavity and rigidly connected therein and provided at the rear end with means for applying a rotative implement, the inner ends of said socket members provided with interengaging bevel-gears.

2. In an implement of the class described, a tubular casing internally threaded at the ends and with the forward portion disposed at an angle to the rear portion, a tubular sleeve externally threaded and adjustably engaging the forward portion of said casing, and provided with a bearing in advance of the sleeve, a tubular sleeve externally threaded and adjustably engaging the rear portion of said casing and provided with a bearing in the rear of the sleeve, a socket member journaled in said forward sleeve and having a cavity for receiving a boring implement, a socket member journaled in the rear sleeve and having a cavity extending longitudinally therein, a stock engaging said longitudinal cavity and rigidly connected therein and provided at the rear end with means for applying a rotative implement, the inner ends of said socket members having interengaging gears, a supporting-frame clamped to the bearing of said rearward portion of the casing and with spaced sides extending parallel to the forward portion of the casing, and a brace clamped to the bearing of the forward portion of the casing and connected at the ends to the spaced sides of said frame.

3. In an implement of the class described, a casing with the forward portion disposed at an angle to the rear portion and with bearings extending forwardly and rearwardly of the same, a socket journaled in said forward portion and having means for supporting a boring implement, a socket journaled in the said rear portion and having means for supporting an operating member, means within the casing for transmitting the motion of the operating member to the boring implement, a supporting-frame clamped to the bearing of said rearward portion of the casing and with spaced sides extending parallel to the forward portion of the casing, and a brace clamped to the bearing of the forward portion of the casing and connected at the ends to the spaced sides of said frame.

4. In an implement of the class described, a tubular casing with one portion disposed at an angle to the other portion, a socket journaled in one of said angular portions and with means for supporting a boring implement and extended into a bearing, a socket journaled in the other of said angular portions and having means for supporting an operating member and extended into a bearing, means within said casing for transmitting the motion of said operating member to said boring member, a tubular shield disposed over said operating means and engaging said last-mentioned bearing and with means at the free end for supporting the free end of said operating means, a guide member formed from a U-shaped bar engaging the shield opposite the bearing inclosed thereby, and with its sides extending parallel to and spaced from said boring implement, and a brace engaging said first-mentioned bearing and connected to said spaced sides.

5. In an implement of the class described, a casing with one end extended at an angle to the other end, a socket journaled in one end of said casing and having means for supporting a boring implement, a socket journaled in the other end of said casing and having means for supporting an operating member, means within the casing for causing the motion imparted to said operating member to be communicated to said boring implement, and a guiding member formed from a U-shaped bar supporting one end of the casing and its attachments and with the spaced sides tending parallel to the boring-implement support and spaced from the same, and a brace connecting said sides of said guiding member with the other end of the casing and its attachments.

In testimony that we claim the foregoing as our own we have hereto affixed our signatures in the presence of two witnesses.

JEFFERSON F. PIERCE.
WILLARD G. PIERCE.

Witnesses:
L. W. SMITH,
EMMA SUGGS.